March 10, 1936.                C. LIRON ET AL                2,033,721
                              SUSPENSION SYSTEM
                           Filed March 6, 1934           2 Sheets-Sheet 1

C. Liron
G. Veper
INVENTOR
By Glascock Downing & Seebold
Attys.

March 10, 1936.  C. LIRON ET AL  2,033,721
SUSPENSION SYSTEM
Filed March 6, 1934  2 Sheets-Sheet 2

C. Liron & G. Veper
INVENTORS

By Glascock Downing & Seebold
Attys.

Patented Mar. 10, 1936

2,033,721

UNITED STATES PATENT OFFICE 2,033,721

SUSPENSION SYSTEM

Charles Liron and George Veper,
Chateaubriant, France

Application March 6, 1934, Serial No. 714,308
In France March 7, 1933

5 Claims. (Cl. 155—9)

This invention relates to a suspension device applicable to suspension systems of any type, and more particularly to the suspension of seats, such as the seats of motor vehicles, motor cycles, bicycles and so forth.

In one embodiment of the invention two springs or groups of springs are provided one of which operates continuously in the direction of its axis, so that its flexibility remains substantially constant, this spring or group of springs being thus adapted merely to support a mass. On the other hand the second spring or group of springs is so disposed that its axis forms a certain angle with the direction of movement of the mass, this angle being adjustable as required. In the limit case, i. e. when the mass is zero, the auxiliary springs or spring are or is located at right angles to the direction of movement, the angle varying progressively with the movement of the mass. Consequently, the flexibility of the auxiliary springs is reduced as the load increases.

The suspension system according to the invention assures therefore maximum flexibility for any suspended load. It is to be understood that the springs may be replaced by any other elastic device, the invention, in its broad aspect, consisting in the provision of two elastic members or two groups of elastic members, one of which is of a substantially constant flexibility while the other is of variable flexibility, whereby under varying loads the flexibility of the complete system is adjustable as desired.

In another embodiment of the invention masses are interposed in the springs or only one spring of a suspension system either directly or under the interposition of levers, said masses dividing the springs or other elastic members into a plurality of elements. Each element will then possess its own period of vibration, so that an interference of vibrations may be brought about whereby the transmission of the vibration to the suspended member may be avoided.

It is understood that the two embodiments above referred to may be utilized separately or in combination without thereby leaving the spirit of the invention.

In the accompanying drawings various embodiments and methods of application of the invention are illustrated in diagrammatic representation by way of example.

Figure 1:
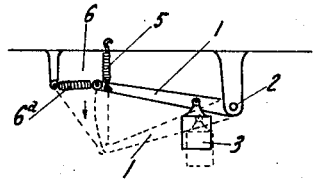
Fig. 1 illustrates the first embodiment of the invention in a general manner.

Referring firstly to Fig. 1, the lever 1 is pivoted at 2 to a fixed support and is adapted to support a mass 3. The free end of the lever is suspended by means of two springs. The first spring 5 is so disposed as to operate substantially in the direction of its axis. This spring, therefore, is adapted to hold the mass 3 suspended.

According to the invention this spring 5 cooperates with a second spring 6, which, when the mass to be supported is very small, is positioned in the direction of the lever 1, or substantially so. When the mass or load increases the lever rocks around its pivot 2 and occupies a position according to the magnitude of the load. In Fig. 1 another position of the lever 1 corresponding to a considerable load is indicated in dotted lines. In this instance the spring 6 occupies the position indicated at 6a. It will be seen that in this position the spring operates in a direction approaching that of its axis. Consequently, the resistance of spring 6, which was zero in the position shown in full lines, has considerably increased by the time it arrived into the position 6a. It is easy to understand that in this manner the resistance of the system, which varies with the variation of the relative positions of the parts, tends to adapt itself automatically to the load applied to the system. Moreover, the suspension system is capable of suitable adjustments, which will be described in more detail later with reference to more developed forms of application.

Figure 2:
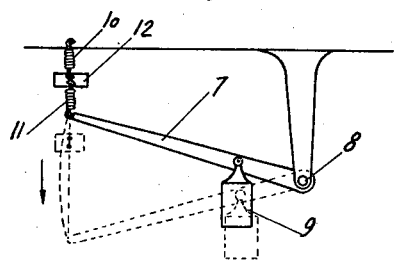
Fig. 2 is a similar view illustrating the second embodiment.

Referring to Fig. 2, which illustrates the second embodiment of the invention, the lever 7 pivoted at one end at 8 and supporting a mass 9 is suspended at its free end by means of a spring which is divided into two parts by means of a supplementary mass 12, the parts of the spring being indicated at 10 and 11. In this manner the period of vibration of the suspending spring may be controlled. By suitably disposing and calculating the mass 12 a periodicity may be obtained at which all vibration of the suspended mass 9 is avoided.

Figure 3:
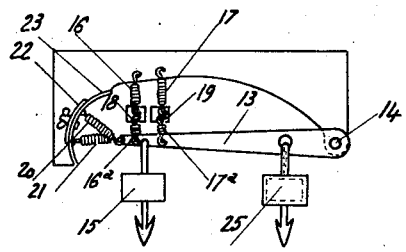
Fig. 3 shows a combination of the two devices.

Fig. 3 illustrates a combination of the two aforesaid devices, whereby a perfect suspension may be obtained. In this example the lever 13 is pivoted at its end 14 and supports a mass 15 disposed near the free end of the lever. The latter is suspended by means of two supporting springs 16, 17, each of which is divided into two parts 16, 16a and 17, 17a by means of the masses 18 and 19 respectively. The suspension system is completed by two further springs 20, 21 disposed according to the general principle described with reference to Fig. 1 and the flexibility whereof decreases in accordance with the displacements of the lever 13, the said displacement increasing with the increase of the mass 15 to be supported. The adjustable end of these springs may be secured to two independent members or to a common member. In the example illustrated in Fig. 3 both springs 20, 21 are secured to a common supporting member 22. The latter is of segment shape and is adapted to slide in a suitable slot formed in the frame 23 and to be secured in any desired position by means of the wing nut 24. By means of this arrangement the initial position of the group of springs 20, 21 may be varied, so that the point of equilibrium of the lever 13 may be displaced into the desired position whatever the load to be supported may be.

It will be observed that in Fig. 3 the spring 6 shown in Fig. 1 has been replaced by two converging springs 20, 21. The object of this arrangement is to restore to the system the advantages of variable flexibility by means of the spring 21 in such cases where, owing to a very considerable load, the spring 20 tends to become a supporting spring.

Figure 7:
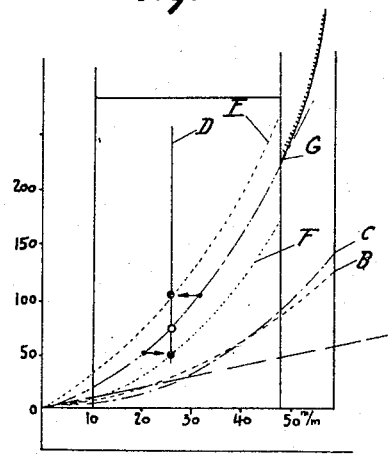
Fig. 7 is a diagram of the system according to the invention.

With the aid of the diagram illustrated in Fig. 7 the conditions of suspension may be investigated by way of analysis. In this diagram the displacements of the suspended mass have been plotted on the abscissa and the loads on the ordinate. A is the curve corresponding to the deformation of the springs 16, 17. Since the flexibility of these springs is substantially constant A is in the form of a straight line. B and C are the curves corresponding to the springs 20, 21 adjusted to a load of 72 kgs. For this adjustment the segment 22 is suitably displaced, this corresponding on the diagram to swinging the curves B, C around the point O. Such displacement makes it therefore possible to cause the point of equilibrium, the locus of which is the vertical line D, to any load. Thus the curve E results from the variations in the action of the springs in the case when the point of equilibrium is reached at 100 kgs., in the case of curve F the point of equilibrium being reached at 50 kgs. and in the case of the curve G at 72 kgs. As will be seen, by action upon the springs 20, 21 the point of equilibrium which is on the vertical line D may be caused to correspond to any load.

It is obvious that instead of being suspended at the end of lever 15 the load could be suspended at a point near the pivotal axis of the lever, in which case the displacements of the charge are reduced in the proportion of the lever arms between the points of application of the load and of the elastic system to the pivotal axis 14. Such position of the load is indicated at 25.

Figure 6:
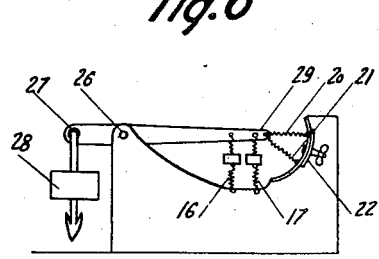
Fig. 6 is a more general representation of same.

Fig. 6 illustrates the application of the system according to the invention to a different type of lever, wherein the fulcrum is located at an intermediate point of the lever indicated at 26, the load 28 being suspended at the end 27 of the smaller arm and the elastic system being applied at the end 29 of the longer arm. The elastic system again comprises two constant flexibility springs 16, 17 and two springs 20, 21 of variable flexibility, also adjustable by means of the segment 22.

Figure 4:
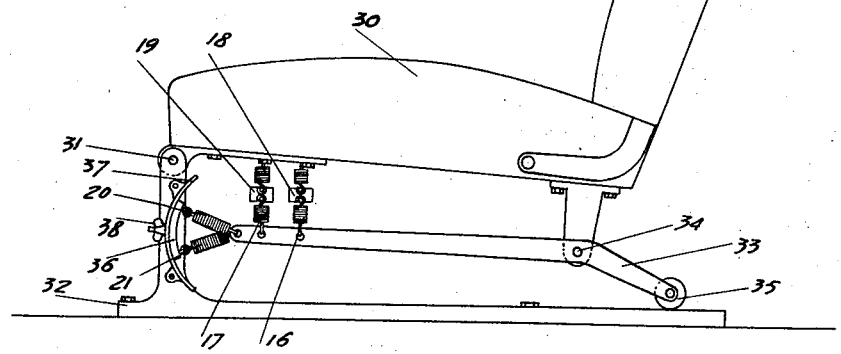
Fig. 4 shows the application of the system to a vehicle seat.
Figure 5:
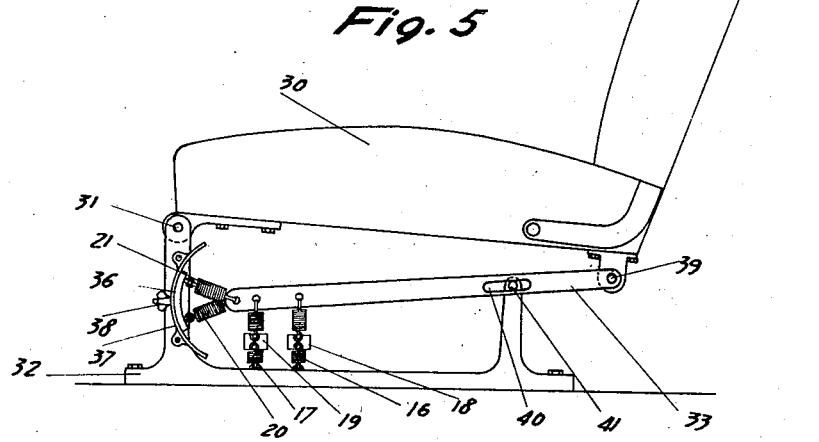
Fig. 5 is a similar view illustrating the application of the system to a seat the suspension whereof is based on another principle.

Figs. 4 and 5 illustrate the application of the two systems shown in Figs. 3 and 6 to seats of motor vehicles.

Figure 4 shows an application of the suspension device diagrammatically illustrated in Figure 3 to the suspension of a seat in a vehicle, say in a motor car.

In this application, seat 30 is hinged in 31 at its front edge on a support 32 fixed on the floor of the vehicle; a lever 33 is pivotally secured in 34 to the rear edge of the seat, at the right end of said lever is mounted a roller 35 able to roll on support 32; the suspension means consist in two coil springs 16, 17 provided with masses, 18, 19 and in two other coil springs 20 and 21. Springs 16 and 17 are anchored on one hand to the left end of the lever and on the other hand to the seat, near the hinge 31, it is easy to see that when the seat rocks round said hinge, springs 16 and 17 will be lengthened or shortened and consequently will exert a strain on the lever.

Springs 20 and 21 are anchored on one hand to the same end of the lever and on the other hand to a segment shaped member 36 which may slide on a circular guide 37 fastened on the support; any convenient means, say a nut 38 may be employed to the fix in any desired position the member 36 on its guide 37.

The working of the device is quite obvious if a load is applied on seat 30, say if some one sits on it, said seat rocks round the hinge 31, the springs are lengthened and the roller rolls on the support allowing the lever to take its new position.

Figure 5 shows a modification wherein the suspension means are like those diagrammatically illustrated in Figure 6.

The lever 33 is pivotally secured at its right end in 39 to the rear edge of seat 30, a slot 40 is provided in said lever, and a pivot 41 fixed on the support is engaged in said slot in such a manner that the lever may slide thereon.

At the left end of the lever are anchored the suspension devices consisting first of two coil springs 16—17 provided with masses 18 and 19 and anchored to the support, and secondly, in two coil springs 20 and 21 anchored on the support by intermediary of an adjustable segment shaped member 36 like that described above in reference to the device represented in Figure 4.

It remains understood that the invention is not limited to the examples illustrated and described, these merely indicating a few possibilities of application of the device. It is also understood that various modifications may be made without departing from the spirit of the invention.

In particular, the curve of the springs may be constituted by any desired number of springs and might even be substituted by various elastic systems. Again, the device for adjusting the inclination of the springs, the fulcrum points and the points of application of loads and so forth may be modified.

Furthermore, it is to be understood that the complete suspension system according to the invention may occupy any desired position relatively to the mass or apparatus suspended thereon or thereby, since its operation is independent of such relative position.

We claim:—

1. A suspension system for seats of vehicles pivotally mounted by their front edge on a support fixed on the vehicle, said system consisting in the combination of a lever pivotally secured to the seat at the rear end thereof, of means intermediate the ends of said lever for causing said lever to bear on the support, and of suspension means for the lever constituted by two groups of elastic devices anchored on one hand with the lever and on the other hand with the support, the first group consisting in at least one elastic member disposed substantially perpendicularly to said lever, the second consisting in at least one elastic member disposed so as to form substantially an extension of the lever, adjustable anchorage means for the second group of elastic devices comprising a guide fixed on the support, a segment shaped anchorage member able to slide on said guide and whereon said elastic members are fastened, means for securing said anchorage member on said guide in any desired place.

2. A suspension system for seats of vehicles pivotally mounted by their front edge on a support fixed on the vehicle, said system consisting in the combination of a lever pivotally secured to the seat at the rear end thereof, of means intermediate the ends of said lever for causing said lever to bear on the support, and of suspension means for the lever constituted by two groups of elastic devices anchored on one hand with the lever and on the other hand with the support, the first group consisting in at least one elastic member disposed substantially perpendicularly to said lever, the second consisting in at least one elastic member disposed so as to form substantially an extension of the lever, and vibration deadening devices consisting in masses interposed intermediate the end of the elastic members and dividing them into a plurality of segments each of which has its own natural period of vibration, said vibrations interfering with one another.

3. A suspension system for seats of vehicles pivotally mounted by their front edge on a support fixed on the vehicle, said system comprising in combination a lever having a fulcrum bearing on said support, means for pivotally securing said lever to the seat, and suspension means for the lever consisting of two groups of elastic devices anchored on one hand to said lever and on the other hand to another part of the system at a point the distance of which to the anchorage point on the lever varies when the seat oscillates; the first group being constituted by at least one elastic member disposed substantially perpendicularly to the lever, the second constituted by at least one elastic member disposed so as to form substantially an extension of the lever.

4. A suspension system for seats of vehicles pivotally mounted by their front edge on a support fixed on the vehicle, said system comprising in combination a lever, means for pivotally securing the first end of said lever to the rear edge of the seat, a fixed pivot mounted on the support, a slot provided in the lever between both ends thereof, said slot being slidably engaged on said pivot, suspension means for the lever constituted by two groups of elastic members, the first one consisting in at least one coil spring the axis of which is substantially perpendicular to the lever, said member being anchored on one hand to the second end of the lever and on the other hand to the support, the second one consisting in at least one coil spring the axis of which forms substantially an extension of the axis of the lever said member being anchored on one hand to the second end of the lever and on the other hand to the support.

5. The device as claimed in claim 1 in which said lever has a slot therein and the means intermediate the ends of said lever for causing said lever to bear on said support consisting of a column integral with said support and a pin rigid with said column, slidable in said slot.

CHARLES LIRON.
GEORGE VEPER.